(12) United States Patent
Imamura et al.

(10) Patent No.: US 7,440,189 B2
(45) Date of Patent: Oct. 21, 2008

(54) METHOD FOR MAKING LENS ARRAY HAVING LIGHT-SHIELDING LAYER

(75) Inventors: Norihiro Imamura, Kyoto (JP); Hisayoshi Fujimoto, Kyoto (JP); Minori Torama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1455 days.

(21) Appl. No.: 09/870,522

(22) Filed: Jun. 1, 2001

(65) Prior Publication Data
US 2002/0063348 A1    May 30, 2002

(30) Foreign Application Priority Data
Jun. 1, 2000    (JP)    .............................. 2000-164437

(51) Int. Cl.
*G02B 27/10* (2006.01)
(52) U.S. Cl. ........................ 359/619; 359/618; 359/620; 359/621
(58) Field of Classification Search ................. 359/619, 359/620, 618, 621, 819, 821, 811
See application file for complete search history.

(56) References Cited

U.S. PATENT DOCUMENTS

| | | | |
|---|---|---|---|
| 4,247,493 A * | 1/1981 | Brown | 264/1.36 |
| 5,023,442 A * | 6/1991 | Taniguchi et al. | 250/208.1 |
| 6,373,635 B1 * | 4/2002 | Fujimoto et al. | 359/619 |
| 6,449,099 B2 * | 9/2002 | Fujimoto et al. | 359/621 |
| 6,545,811 B1 * | 4/2003 | Fujimoto | 359/619 |

FOREIGN PATENT DOCUMENTS

JP    11-023805    1/1999

OTHER PUBLICATIONS

English language Abstract of JP-A-11-23805.

* cited by examiner

*Primary Examiner*—Ricky Mack
*Assistant Examiner*—Brandi N Thomas
(74) *Attorney, Agent, or Firm*—Michael Bednarek; Paul, Hastings, Janofsky & Walker LLP

(57) ABSTRACT

A method of making a lens array includes a first step of forming a resin-molded piece, a second step of applying a coating to the resin-molded piece, a third step of melting the applied coating and a fourth step of solidifying the melted coating. The resin-molded piece formed in the first step includes a plurality of lenses each having a convex lens surface, and a holder portion for holding the plurality of lenses. In the second step, the coating is applied to the holder portion so as to surround each lens surface.

1 Claim, 17 Drawing Sheets

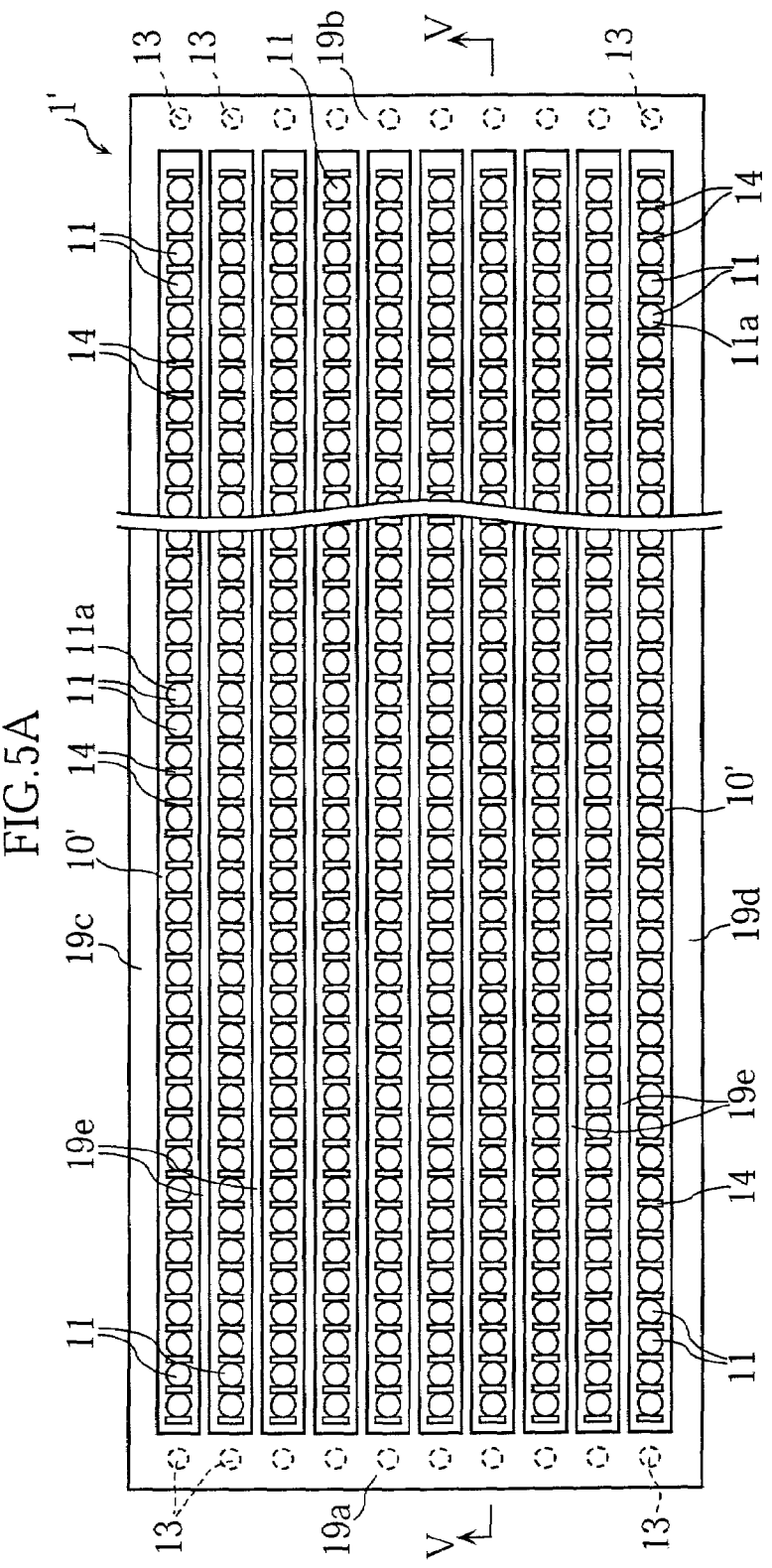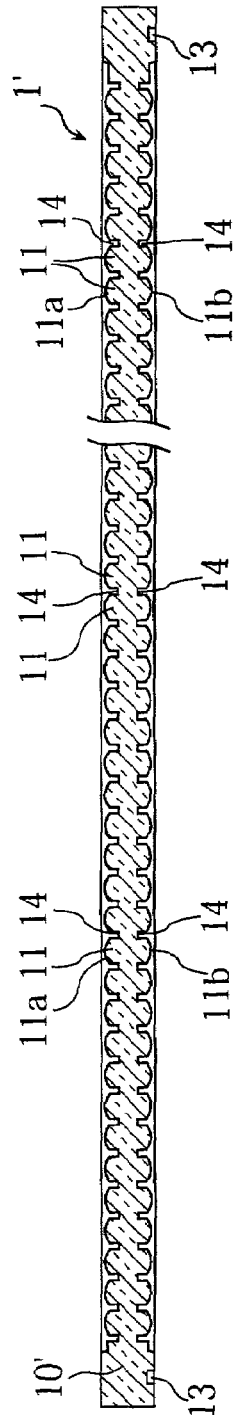

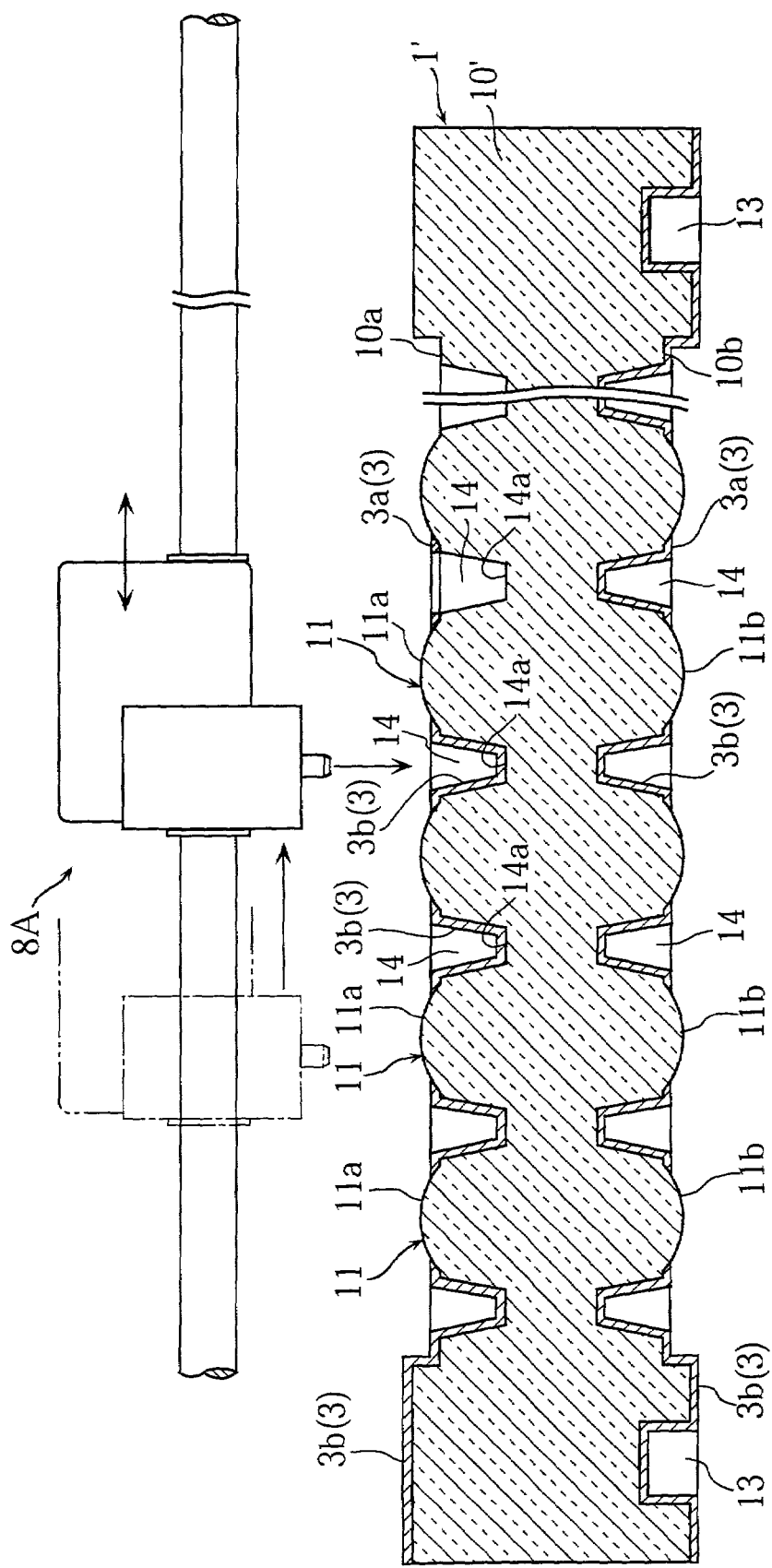

METHOD FOR MAKING LENS ARRAY HAVING LIGHT-SHIELDING LAYER

BACKGROUND OF THE INVENTION

1. Field of the Invention

The present invention generally relates to an image-forming lens array for use in an image reading apparatus or the like. The present invention particularly relates to light-shielding treatment for such a lens array.

2. Description of the Related Art

FIG. 20 of the accompanying drawings illustrates a prior art lens array 9 to be built in an image reading apparatus such as a scanner. The lens array 9 includes an elongate holder 90, and a plurality of selfoc lenses (rod lenses) 91 held in the holder 90. The lenses 91 are arranged at a predetermined pitch longitudinally of the holder 90.

As shown in FIG. 21, light entering each selfoc lens 91 takes repetitively bent path within the lens. Therefore, with the lens array 9, it is possible to form the actual size erect image a'→b' of an original image a→b.

In the prior art, to provide the lens array 9, the plurality of selfoc lenses 91 are individually formed. Then, by insert-molding a resin, a holder 90 may be formed to embed the plurality of selfoc lenses 91.

However, the formation of the lens array 9 with such a prior art method is troublesome, because the formation of the lenses 91 and the resin-molding of the holder 90 are carried out in separate steps. The formation of the lens array is particularly complicated because each lens 91 is very small and a large number of lenses are necessary for making one lens array. Moreover, in the prior art lens array 9, cross talk of light is likely to occur between adjacent lenses 91, which is disadvantageous.

SUMMARY OF THE INVENTION

The present invention is conceived under such circumstances. Therefore, an object of the present invention is to provide a lens array which can be manufactured efficiently while having good optical characteristics.

In accordance with a first aspect of the present invention, there is provided a method of making a lens array comprising a step of forming a resin-molded piece which includes a plurality of lenses each having a convex lens surface and a holder portion for holding the plurality of lenses, a step of applying a coating to the holder portion so as to surround said each lens surface, a step of melting the applied coating, and a step of solidifying the melted coating.

Preferably, the plurality of lenses may be integral with the holder portion.

Preferably, the coating may be solid ink.

Preferably, the coating may be applied by an ink jet printer.

Preferably, a plurality of recesses for partitioning the plurality of lenses may be formed in the holder portion.

Preferably, a light-shielding layer may be formed on wall surfaces defining the plurality of recesses.

Preferably, the resin-molded piece may be divided into a plurality of individual lens arrays.

In accordance with a second aspect of the present invention, there is provided a method of performing a light shielding treatment for a transparent member having a flat surface at least partially and a projection rising in the flat surface.

This method comprises a step of applying a black material to the flat surface so as to surround the projection, a step of melting the black material so that the black material partially cover the projection, and a step of solidifying the melted black material.

Preferably, the applied black material may constitute a closed loop which surrounds the projection. Alternatively, the applied black material may constitute a plurality of arc segments spaced from each other.

In accordance with a third aspect of the present invention, there is provided a lens array comprising a plurality of lenses each of which has a convex lens surface, a holder portion for holding the lenses, and a light-shielding member provided at the holder portion. The light-shielding member overlaps a circumferentially peripheral portion of each lens surface.

Preferably, the light-shielding member may include a first light-shielding layer and a second light-shielding layer which are made of different materials. The first light-shielding layer overlaps the circumferentially peripheral portion of each lens surface. The second light-shielding layer is formed at the holder portion so as to surround the first light-shielding layer.

Other features and advantages of the present invention will become clearer from the description of embodiments given below.

BRIEF DESCRIPTION OF THE DRAWINGS

FIG. 5A is an example of resin-molded piece for collectively forming a plurality of lens arrays.

FIG. 5B is a sectional view taken along lines V-V in FIG. 5A.

FIG. 13 is a sectional view showing a step of light shielding treatment for the resin-molded piece.

DETAILED DESCRIPTION OF THE PREFERRED EMBODIMENT

Preferred embodiments of the present invention will be described below with reference to the accompanying drawings.

FIGS. 1~4 illustrate an example of lens array which is made by a manufacturing method of the present invention. As can be seen from FIG. 2, the illustrated lens array A1 comprises a transparent body 1, and a light-shielding layer 3 formed on the body 1.

Figure 1:
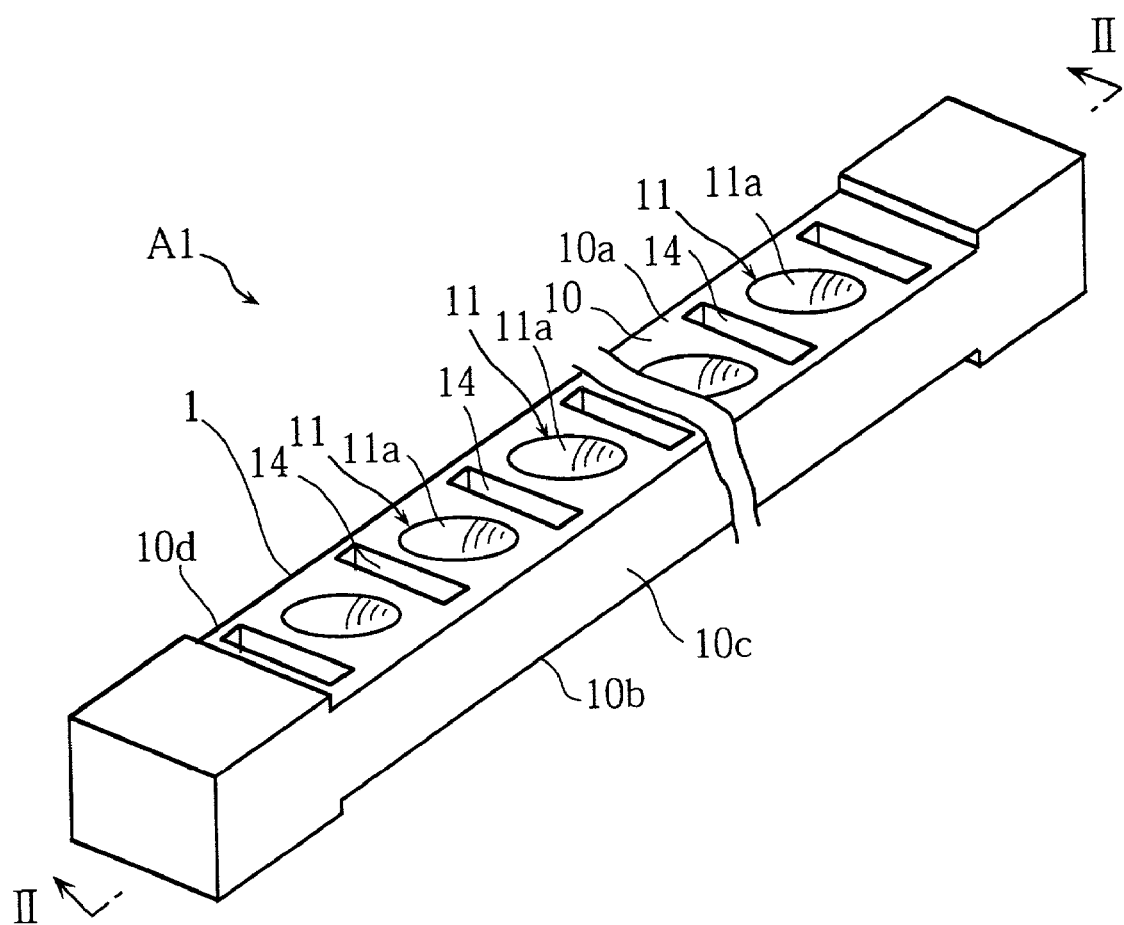
FIG. 1 is a perspective view showing an example of lens array in accordance with the present invention.
Figure 2:
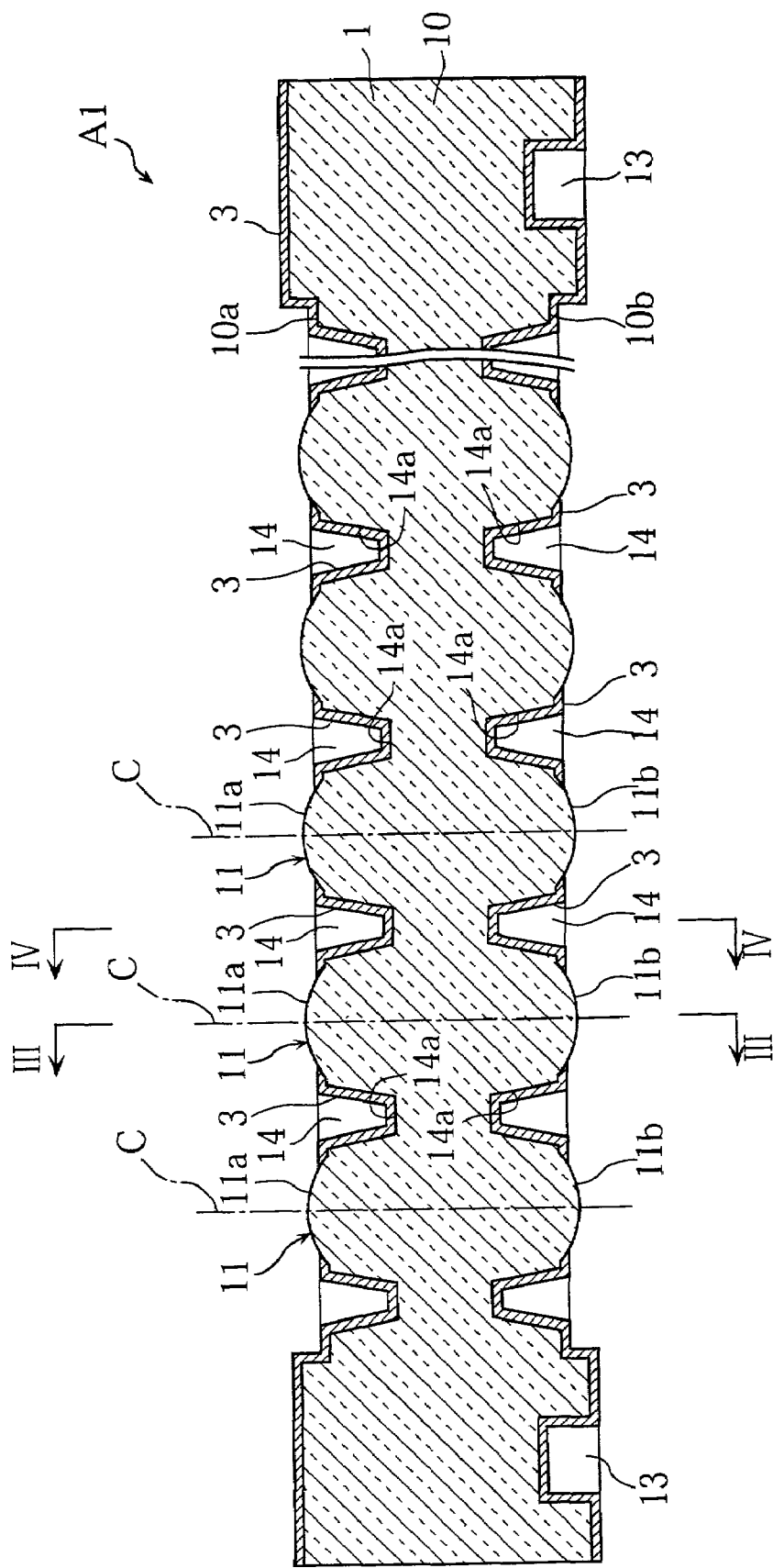
FIG. 2 is a sectional view taken along lines II-II in FIG.

As shown in FIGS. 1 and 2, the body 1 includes a plurality of lenses 11 aligned at a predetermined pitch in a row, and a holder 10 for holding the plurality of lenses 11. The lenses 11 may be arranged at a pitch of about 0.75~1.0 mm for example. The holder 10 and the lenses 11 are integrally formed with each other. The body 1, which is elongated in one direction, may be made of light-permeable synthetic resin. Examples of such resin include PMMA (polymethyl methacrylate) and PC (polycarbonate). The holder 10 includes an upper surface 10a and a lower surface 10b which are spaced vertically (thicknesswise) (See also FIG. 3). The holder 10 also includes a first side surface 10c and a second side surface 10d which are spaced widthwise.

Figure 3:
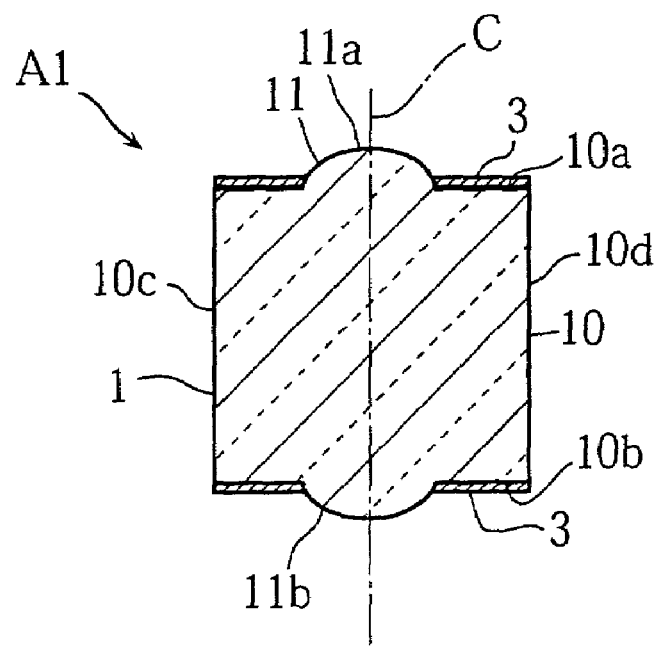
FIG. 3 is a sectional view taken along lines III-III in FIG. 2.

As shown in FIGS. 2 and 3, each lens 11 has an upper lens surface 11a and a lower lens surface 11b. Both lens surfaces 11a and 11b are convex. As shown in FIG. 3, the upper lens surface 11a is surrounded by the upper surface 10a of the holder 10, whereas the lower lens surface 11b is surrounded by the lower surface 10b of the holder 10. Each lens 11 has an axis C extending thicknesswise of the holder 10. The lens surfaces 11a, 11b may be either spherical or aspherical. In the illustrated embodiment, each lens surface 11a, 11b has a diameter of about 0.6 mm.

Figure 4:
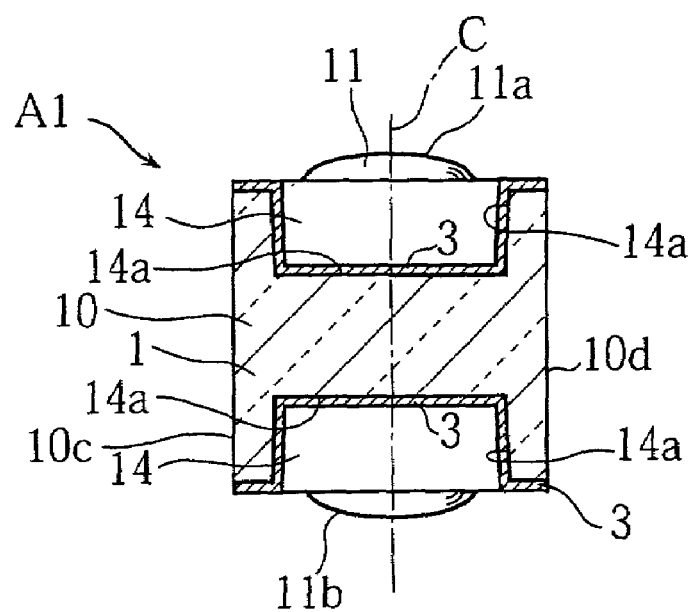
FIG. 4 is a sectional view taken along lines IV-IV in FIG. 2.

As clearly shown in FIGS. 2 and 4, each of the upper surface 10a and the lower surface 10b of the holder 10 is respectively formed with a plurality of recesses 14 for partitioning the lenses 11 from each other. Each recess 14 is defined by wall surfaces 14a which are covered with the above-described light-shielding layer 3. The light-shielding layer 3 also covers the upper surface 10a and the lower surface 10b of the holder 10. The light-shielding layer 3 may comprise a black coating for example. It is to be noted that the light-shielding layer 3 is omitted in FIG. 1.

As shown in FIG. 2, the lower surface 10b of the holder 10 is also formed with recesses 13 respectively provided at longitudinally opposite ends thereof. The recesses 13 may be utilized when the lens array A1 is used in combination with another lens array, as will be described later.

Next, a method for making the lens array A1 will be described with reference to FIGS. 5~14.

To provide a lens array A1, a resin-molded piece 1' as shown in FIGS. 5A, 5B is first prepared. The resin-molded piece 1' is a plate-like member generally corresponding in configuration to a plurality of lens array bodies 1 which are arranged in parallel and integrally joined to each other. The resin-molded piece 1' includes four edge portions 19a~19d which are thicker than regions for forming the lenses 11 (lens forming regions). Further, a strip portion 19e which is thicker than the lens forming regions is provided between each two adjacent rows of lenses 11. For facilitating the illustration, each recess 14 is shown as if it were in contact with the adjacent lens 11. However, as shown in FIG. 1, the recess 14 and the lens 11 are actually spaced from each other.

Figure 6:
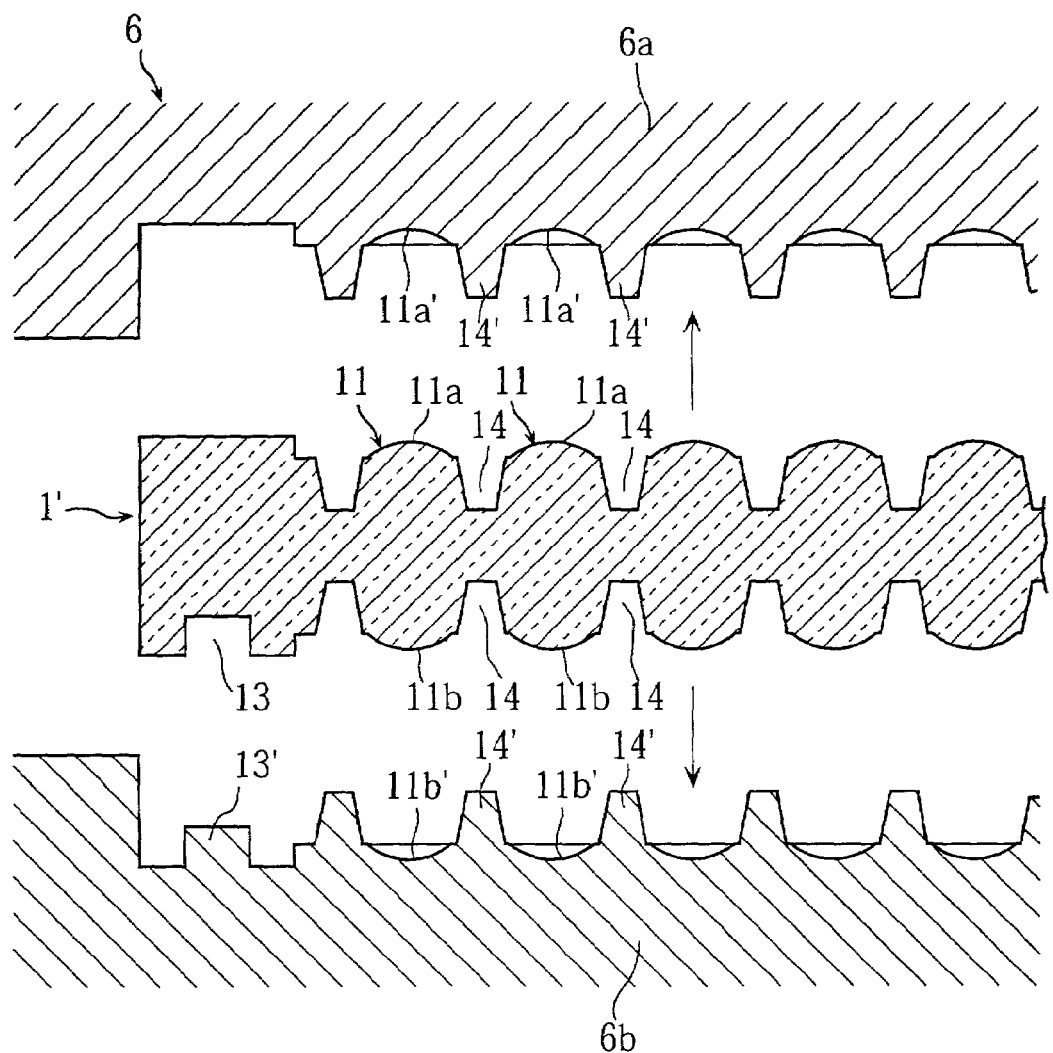
FIG. 6 is a sectional view showing a step for making the resin-molded piece shown in FIG. 5.

The above-described resin-molded piece 1' may be prepared with the use of a mold 6 as shown in FIG. 6. The mold 6 includes an upper mold member 6a and a lower mold member 6b. The upper mold member 6a includes concave surfaces 11a' which correspond to the upper lens surfaces 11a of the lenses 11, whereas the lower mold member 6b includes concave surfaces 11b' which correspond to the lower lens surfaces 11b of the lenses 11. The upper mold member 6a or the lower mold member 6b is further formed with projections 14' which correspond to the recesses 14 of the resin-molded piece 1', and projections 13' which correspond to the positioning recesses 13. The upper and the lower mold members 6a and 6b having the above-described configuration are combined to define a cavity corresponding to the resin-molded piece 1'. The resin molded piece 1' may be obtained by loading transparent synthetic resin into the cavity, followed by solidifying the resin.

The above-described cavity includes recesses which correspond to the above-described edge portions 19a~19d and the strip portions 19e (See FIG. 5A). These recesses increase the volume of the cavity correspondingly, so that it is possible to spread the resin to the entirety of the cavity without leaving any unfilled region.

Figure 20:
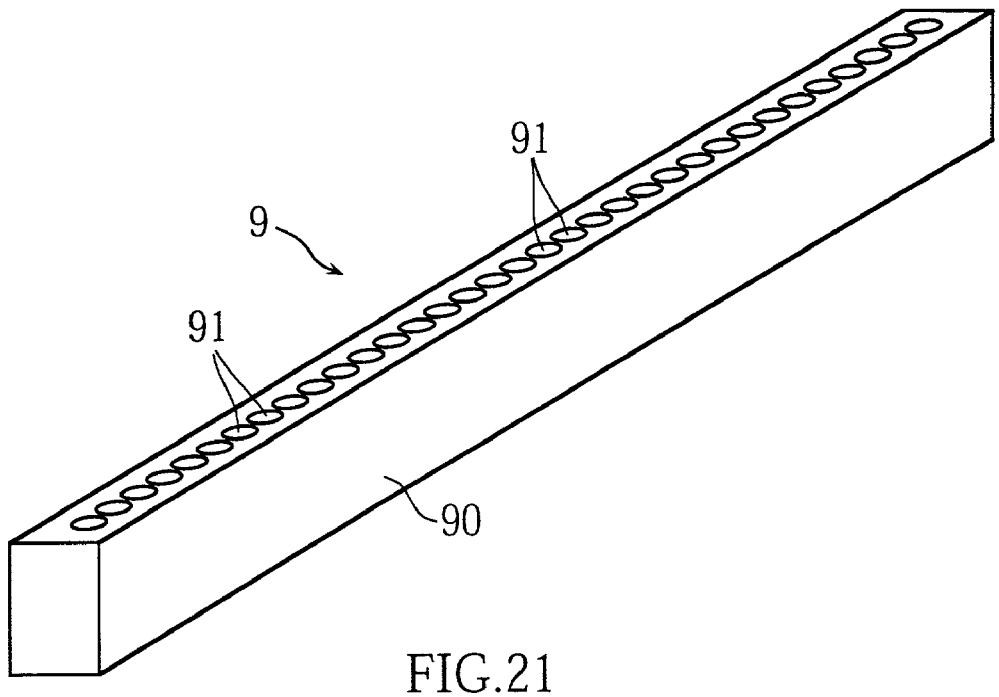
FIG. 20 is a perspective view showing a prior art lens array.
Figure 21:
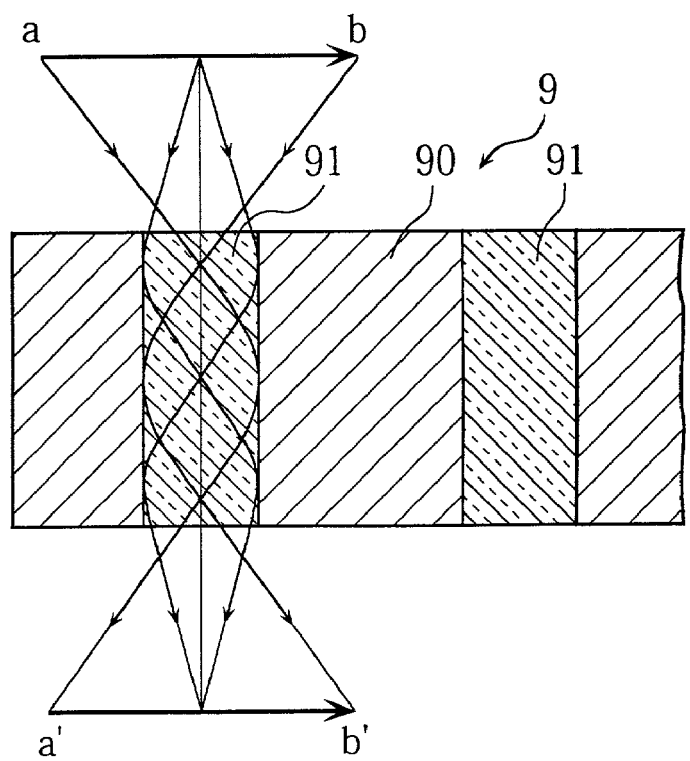
FIG. 21 is a sectional view of a principal portion of the lens array shown in FIG. 20.

With the above-described method, the plurality of lenses 11 and the peripheral portions are integrally formed at the same time. Therefore, unlike the prior art lens array (FIG. 20), it is not necessary to position the lenses individually relative to the holder, which enhances the manufacturing efficiency.

The recesses 14 of the resin-molded piece 1' may not necessarily be formed by the above-described molding. For example, the recesses 14 may be formed by machining using an end mill or laser beam application.

After such fabrication of the resin-molded piece 1', a light shielding treatment is performed, as follows.

Figure 7:
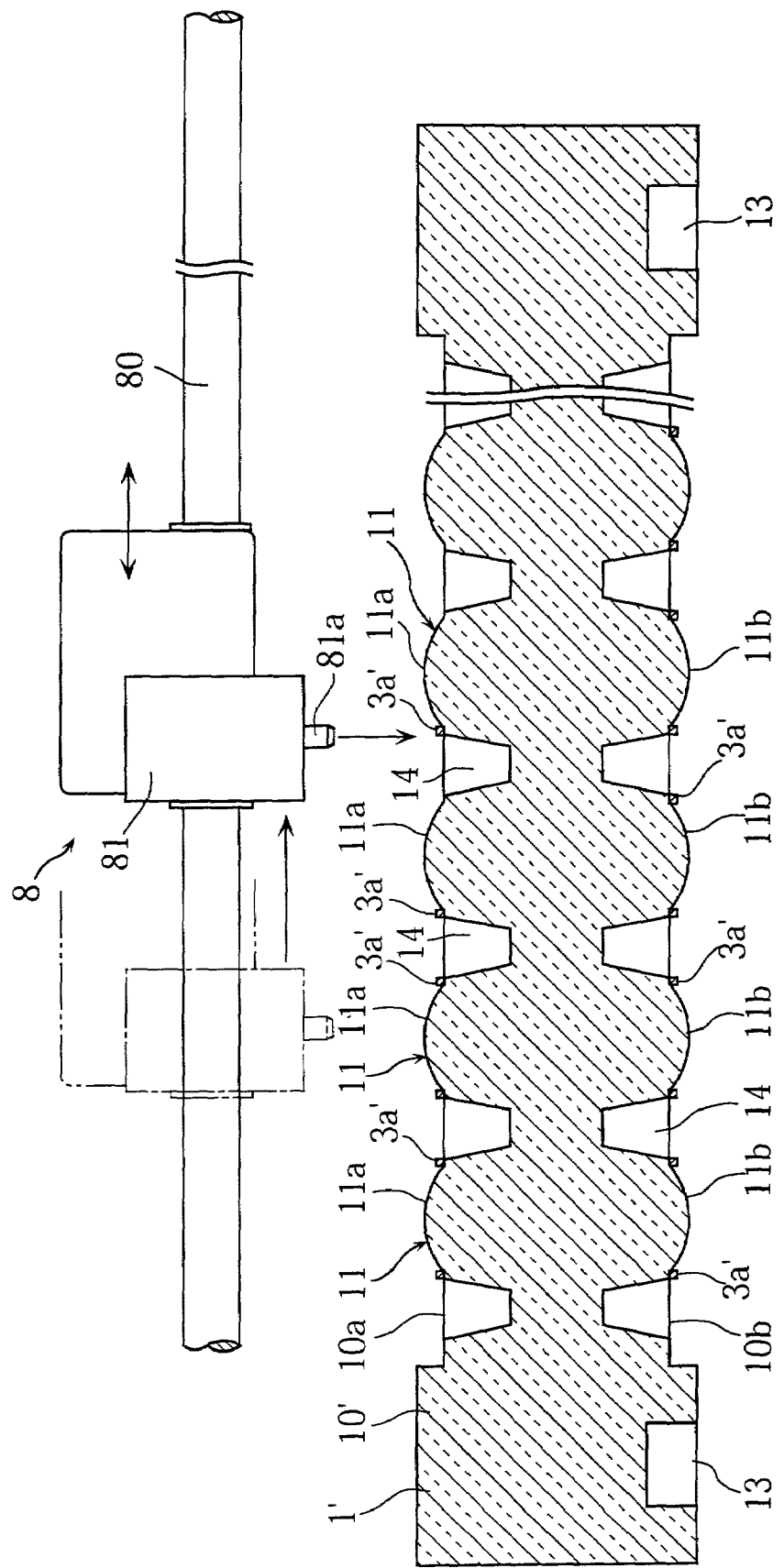
FIG. 7 is a sectional view showing a step of light shielding treatment for the resin-molded member.
Figure 8:
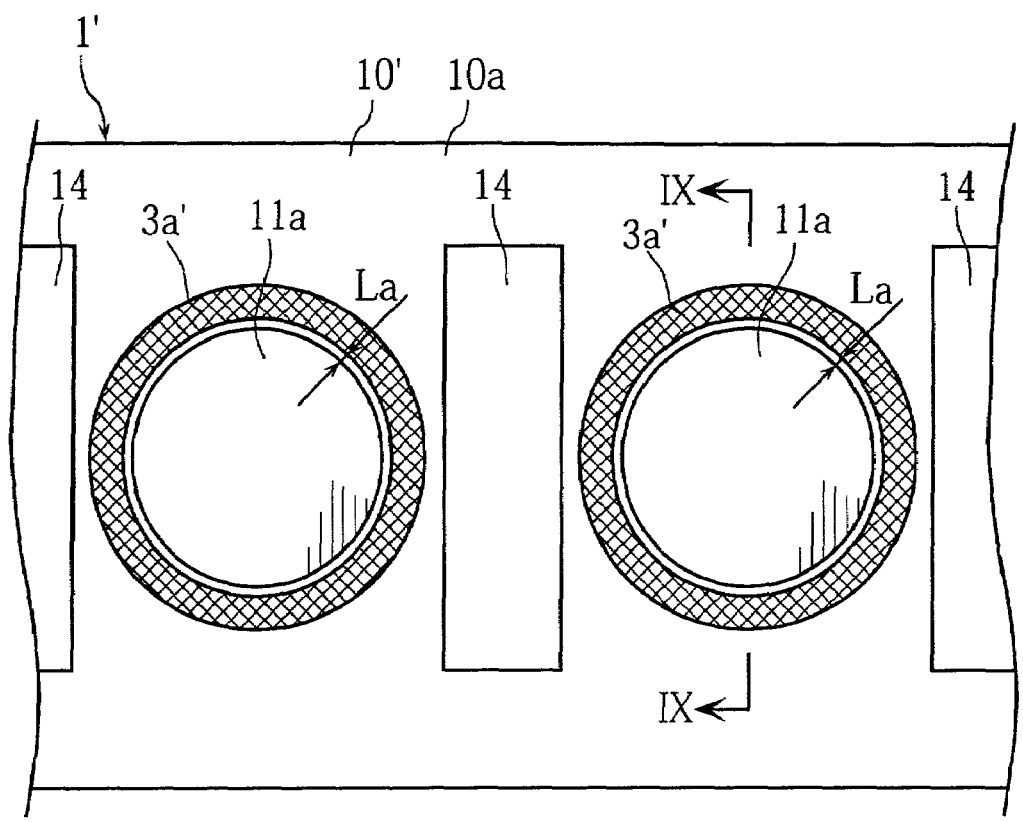
FIG. 8 is a plan view showing an example of coating layer formed on the resin-molded piece.

Firstly, as shown in FIG. 7, black solid ink is applied to the upper surface 10a of a holder 10' by using an ink jet printer 8. As shown in FIG. 8, application of the ink is so performed as to form a circular coating layer 3a' which surrounds each upper lens surfaces 11a. The ink-jet printer 8 includes a printhead 81 which is provided with an ink jet nozzle 81a. The printhead 81 is movable longitudinally of a guide rod 80. The guide rod 80 is movable back and forth horizontally transversely. As a result, the ink jet nozzle 81a is movable freely in a horizontal plane. Under the control of a non-illustrated controller, the ink-jet printer 8 sprays the solid ink to predetermined regions.

The above-described ink application is also performed with respect to the lower surface 10b of the holder 10', thereby forming a circular coating layer 3a' which surrounds the lower lens surface 11b of each lens 11 (See FIG. 7).

By the coating method utilizing the ink jet printer 8, it is possible to efficiently apply the solid ink to the holder 10'. The solid ink is in a solid state at room temperature, but melts at a temperature of about $_{80}$° C. for example. The solid ink is in a melted state during the application to the holder 10', and thereafter is allowed to solidify as it cools down.

Figure 9:
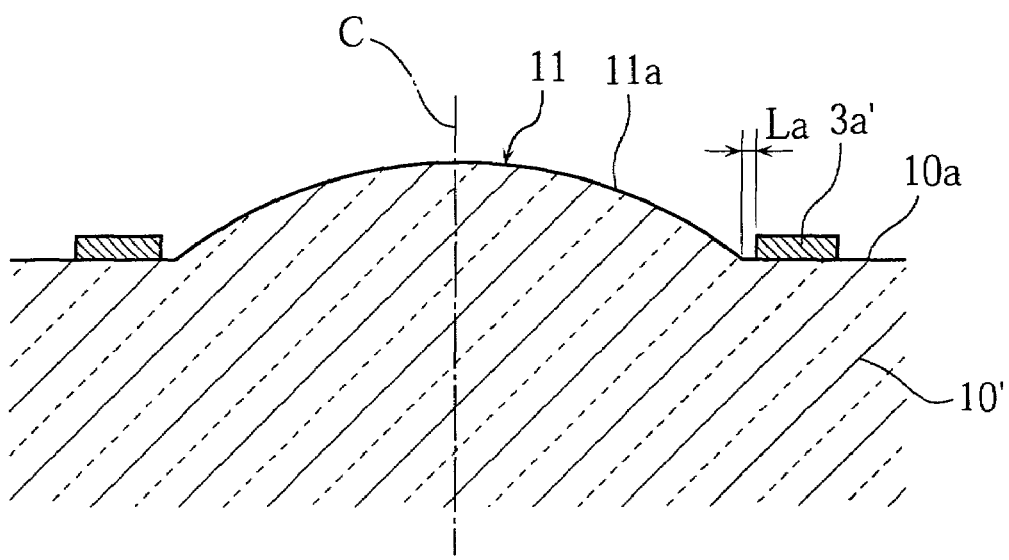
FIG. 9 is a sectional view taken along lines IX-IX in FIG. 8.

As shown in FIGS. 8 and 9, each circular coating layer 3a' is so formed as to be spaced from the outer circumference of the corresponding lens surface 11a (or 11b) by an appropriate distance La. This prevents the solid ink from being undesirably applied on the lens surface 11a due to positioning errors of the ink-jet printer 8.

Figure 10:
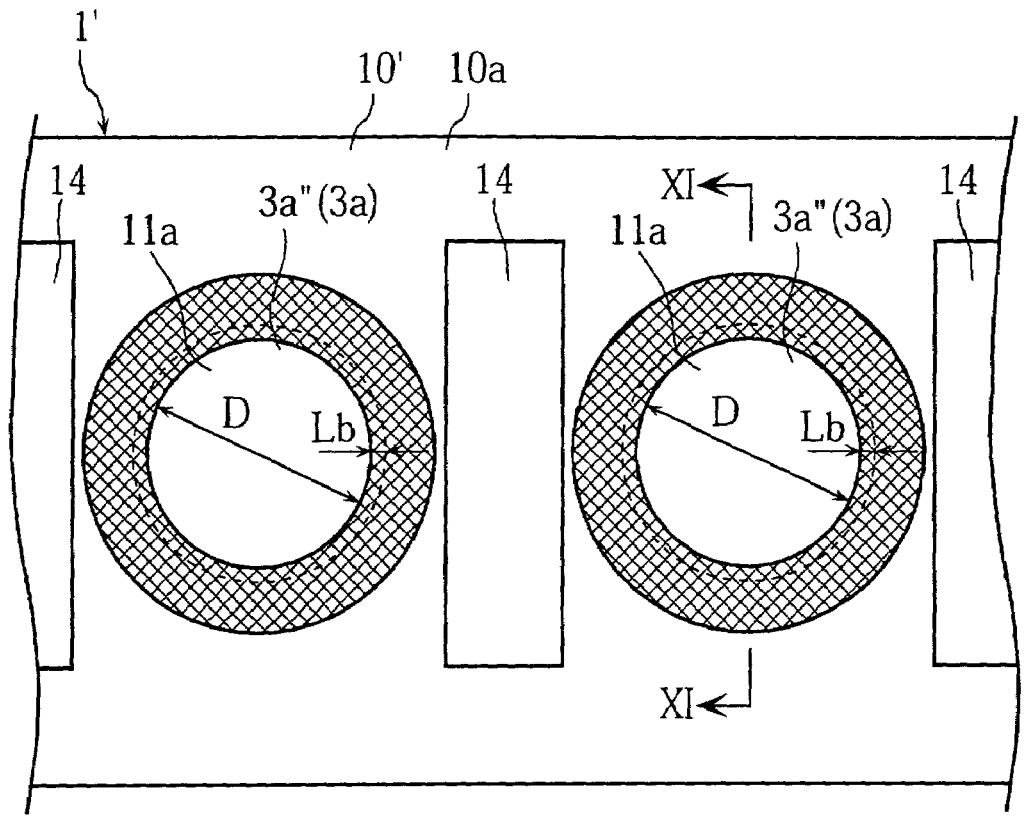
FIG. 10 is an example of light-shielding film obtained by heating the coating layer shown in FIGS. 8 and 9.
Figure 11:
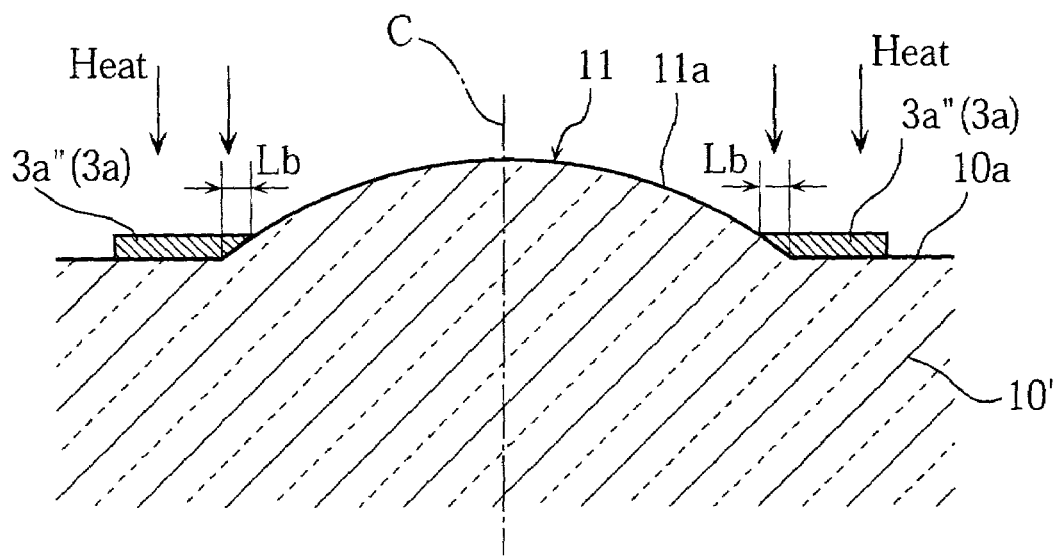
FIG. 11 is a sectional view taken along lines XI-XI in FIG. 10.

After each coating layer 3a' is formed, the coating layer 3a' is heated for melting the solid ink. As a result, as shown in FIGS. 10 and 11, the fluid ink 3a'' spreads on the upper surface 10a of the holder 10', thereby overlapping the circumferential portion of the lens surface 11a uniformly therearound by an appropriate amount Lb.

Similarly, the coating layer 3a' formed on the lower surface 10b of the holder 10' is heated. At this time, the lower surface 10b may be heated as it is oriented downward.

Alternatively, the heating may be performed with the lower surface 10b oriented upward by turning over the resin-molded piece 1'. Because of the stickiness of the melted ink 3a", the melted ink 3a" does not drop from the lower surface 10b even when the lower surface 10b is oriented downward.

The melted ink 3a" is then allowed to solidify as it cools down. Thus, as shown in FIG. 10, a light-shielding layer 3a having an opening of a diameter D is provided for each lens 11. The center of the opening coincides with the axis C of the lens 11. The diameter D of the opening is smaller than the diameter of the lens surface 11a.

With the above-described method, the melted coating material closely surrounds each lens surface. Therefore, it is possible to positively carry out the light-shielding treatment for the peripheral portion of the lens surface. Even when the coating layer 3a' of the solid ink is formed at a somewhat inaccurate position relative to the lens surface, the coating layer 3a' is thereafter fluidized under heating, thereby being finally positioned accurately around the lens surface.

Figure 12A:
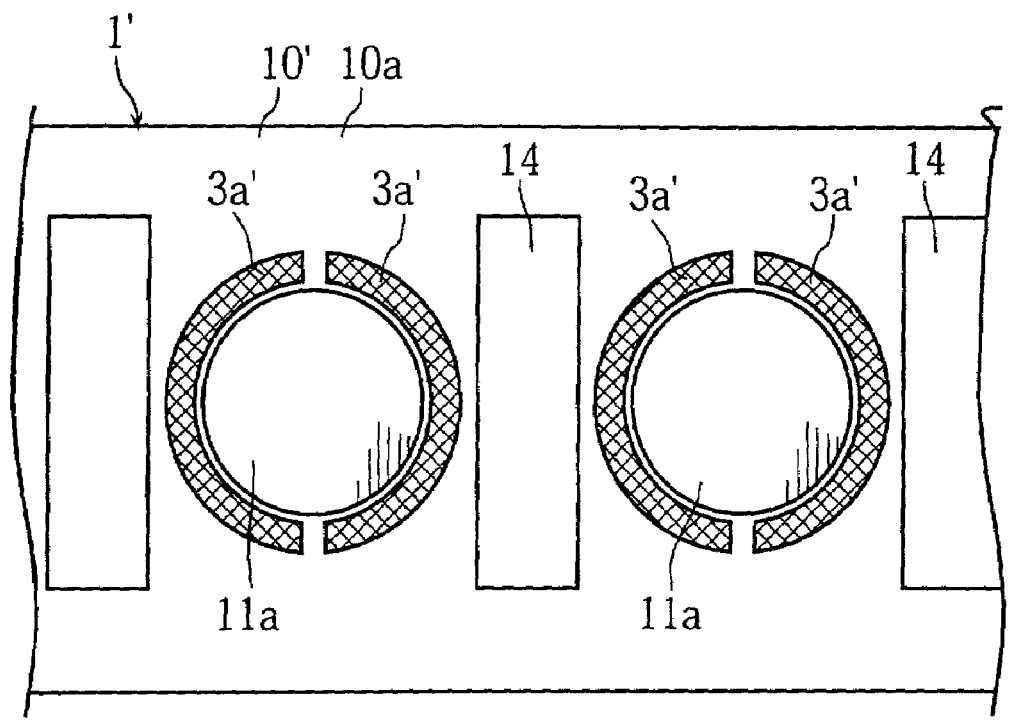
FIG. 12A and FIG. 12B illustrate examples of coating layer formed on the resin-molded piece.
Figure 12B:
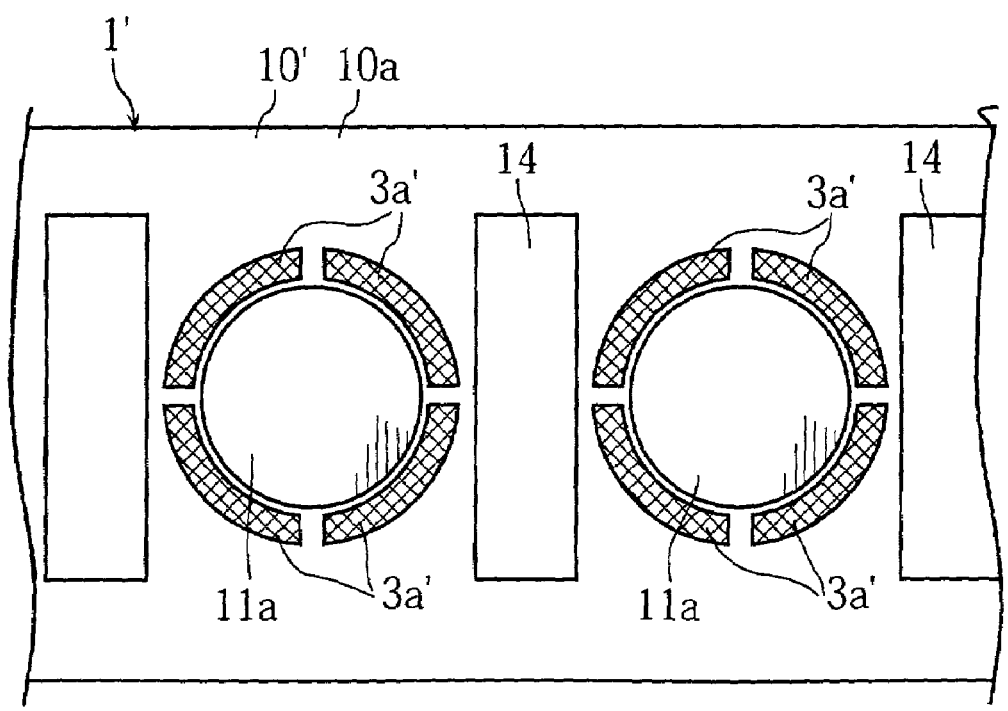

In the present invention, each coating layer 3a' for surrounding the lens surface 11a or 11b may not necessarily be a closed loop. For example, as shown in FIGS. 12A and 12B, the coating layer 3a' may comprise two or more arcs. Even in this case, by heating and melting the coating layer 3a', the originally separated arcs are joined together to form a ring. By thus dividing the coating layer 3a' into a plurality of arcs, it is possible to adjust the amount of the solid ink applied around the lens surface 11a, thereby adjusting the amount of melted ink overlapping the lens surface 11a.

As shown in FIG. 13, after the light-shielding layer 3a is formed, black coating is applied to exposed portions of the upper and the lower surfaces 10a, 10b of the holder 10' to form light-shielding layers 3b. Thus, a light-shielding layer 3 comprising light-shielding layers 3a and 3b is completely formed. The light-shielding layer 3b surrounds the light-shielding layer 3a adjacent each lens surface 11a.

The light-shielding layer 3b may be applied by spraying, with the ink-jet printer 8A, black oil-based ink which is cheaper than the solid ink. The circumferential portion of each lens surface 11a or 11b is already formed with the light-shielding layer 3a. Therefore, the application of the light-shielding layer 3b can be performed at a position which is sufficiently spaced from the lens surface 11a or 11b. As a result, it is possible to prevent the coating material from being erroneously applied to the lens surface 11a or 11b during the application of the light shielding layer 3b.

As shown in FIG. 13, the light-shielding layer 3b is also applied to the wall surface 14a defining each recess 14. However, when the wall surface 14a is upright, it may be difficult to apply coating to the wall surface 14a by the use of the ink-jet printer 8A. In such a case, each recess 14 may be filled with the ink. For enhancing the light shielding ability, the light-shielding layer 3 may be preferably black or may have a dark color which is nearly black.

Figure 14:
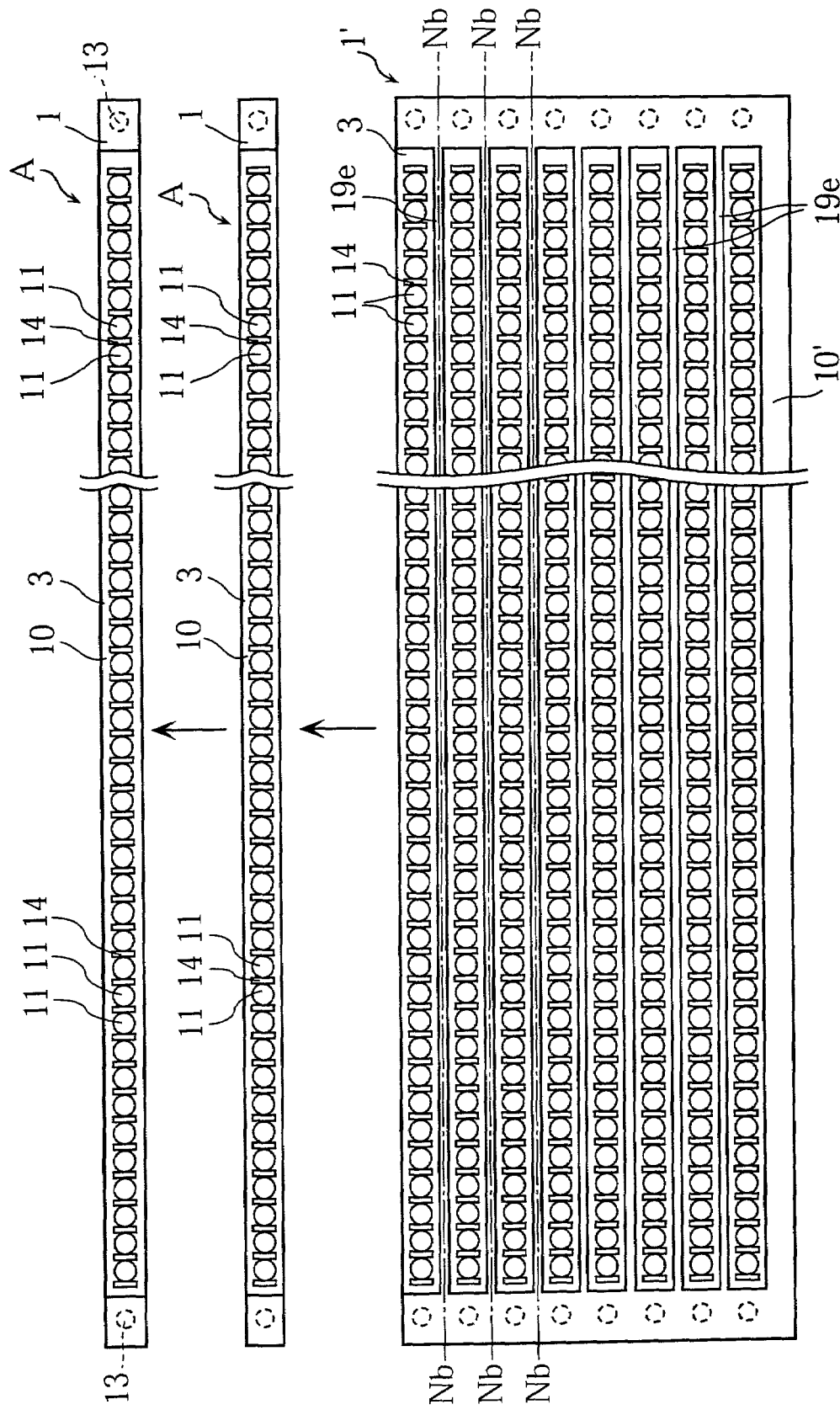
FIG. 14 is a plan view showing a step for dividing the resin-molded piece.

After the above-described light shielding treatment is completed, the resin-molded piece 1' is divided as shown in FIG. 14. Specifically, the resin-molded piece 1' is cut, together with the light-shielding layer 3, along phantom lines indicated by reference signs Nb-Nb. As a result, a plurality of lens arrays A1, each as shown in FIGS. 1~4, are simultaneously obtained.

According to the above-described method for making a lens array, the resin-molded piece 1' can be easily made by an ordinary resin-molding process. Further, it is possible to obtain a plurality of lens arrays A1 from the single resin-molded piece 1'. Therefore, the production efficiency of the lens array A1 can be enhanced. Particularly, the formation of the light-shielding layer 3 on the outer surfaces of the holder is performed collectively with respect to the resin-molded piece which corresponds to a plurality of lens arrays. This particularly enhances the production efficiency and decreases the manufacturing cost for the lens array A1.

To be described next is an example of usage of the above-described lens array A1.

Figure 15:
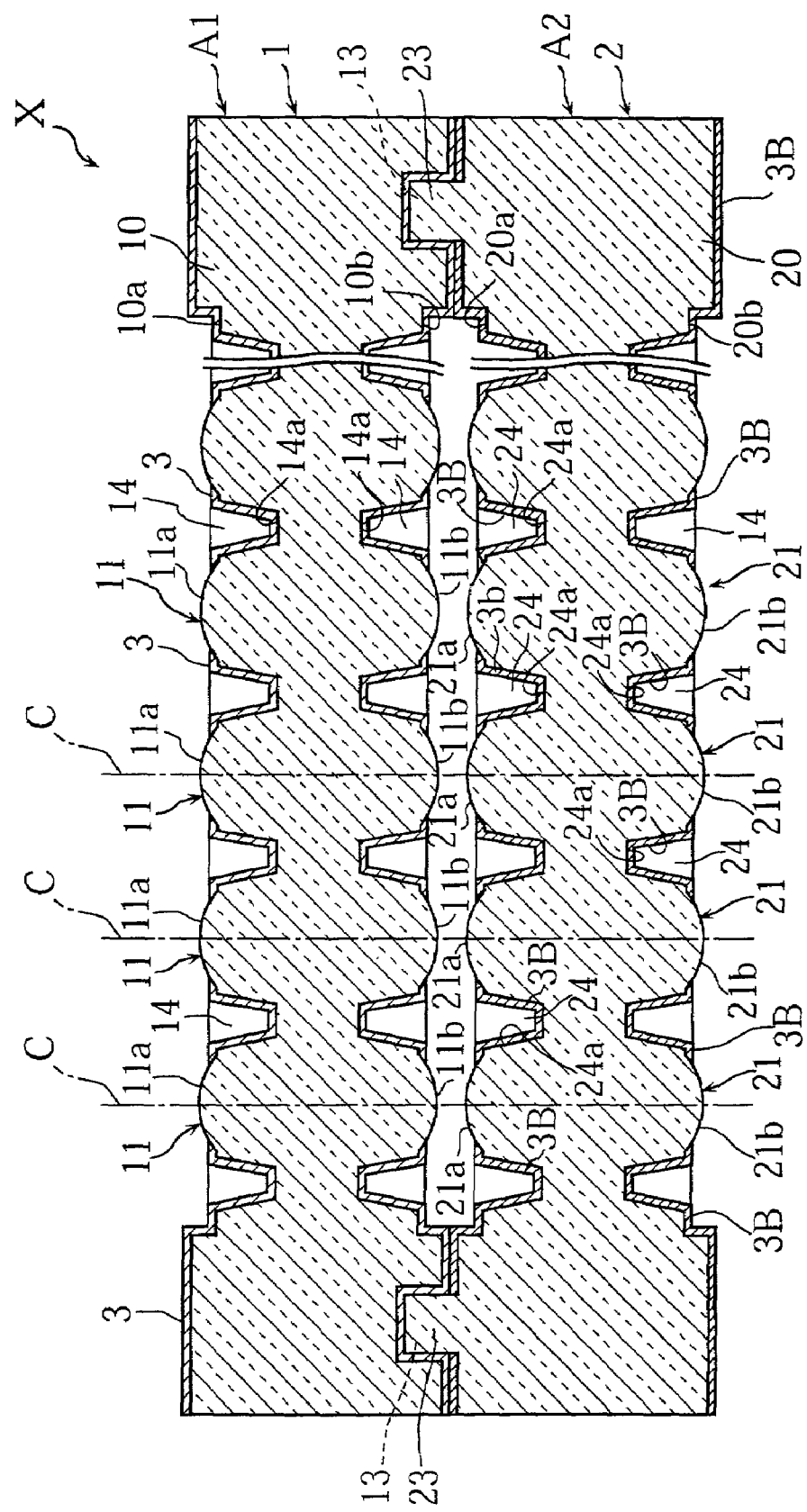
FIG. 15 is a sectional view showing an example of lens array assembly provided by utilizing the lens array shown in FIGS. 1~4.

FIG. 15 illustrates a lens array assembly comprising an lens array A1 and another lens array A2 combined therewith. The lens array A2, which has a structure basically identical to that of the lens array A1, includes a lens array body 2. The lens array body comprises a plurality of lenses 21 each having a pair of convex lens surfaces 21a, 21b, and a holder 20 integrally connected to the plurality of lenses 21. The lens array body 2 may be made of a light-permeable resin. The holder 20 has an upper surface 20a and a lower surface 20b respectively formed with a plurality of recesses 24 for partitioning the lenses 21. A light-shielding layer 3B is formed on wall surfaces 24a defining each recess 24, and the surfaces 20a, 20b of the holder 20. The lens array A2 may be made by a method which is similar to that described with respect to the lens array A1. The upper surface 20a of the lens array A2 is formed, at longitudinally opposite ends thereof, with projections 23. By fitting the projections 23 into the corresponding recesses 13 of the lens array A1, the lens arrays A1 and A2 are laminated so that the axes C of each lens 11 and the corresponding lens 21 are aligned.

Figure 16:
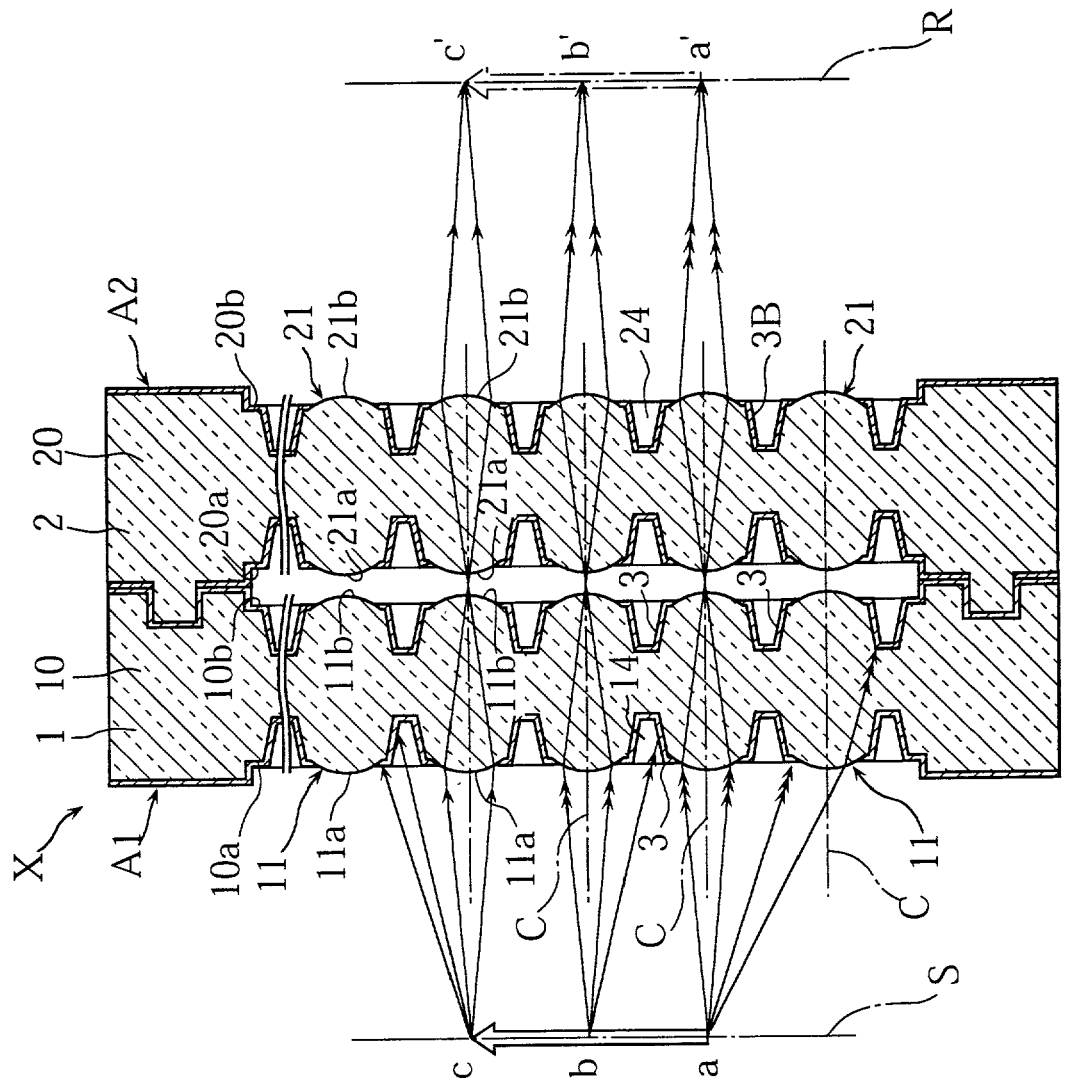
FIG. 16 illustrates the operation of the lens array assembly shown in FIG. 15.

FIG. 16 illustrates an example of optical system utilizing the lens array assembly X. In this optical system, light starting from a starting point S passes through each lens 11 of the lens array A1 and then each lens 21 of the lens array A2 to reach an image forming point R. In this case, the two lenses 11, 21 aligned on a common optical axis C make light to travel in a repetitively bent manner, similarly to a selfoc lens. Therefore, it is possible to form, on the image forming point R, the actual size erect image (a'→b'→c') of an object (a→b→c) existing on the starting point S.

In this optical system, even if light from the starting point S is directed to the upper surface 10a of the holder 10, the light is blocked by the light-shielding layer 3 on the upper surface 10a. Therefore, the light directed to the upper surface 10a does not enter any lens 11 through the upper surface 10a. Light enters each lens 11 only through the lens surface 11a. The light-shielding layer 3 on the upper surface 10a further functions to prevent light which travels from the starting point S from passing through the holder 10 in the thickness direction. The light-shielding layer 3 on the lower surface 10b of the holder 10 functions to prevent light from traveling toward the lens array A2 from portions other than the lens surface 11b.

As described above, since the light-shielding layer 3 exposes a circular portion around the axis C of each lens surface 11a, it is possible to direct light to the lens surface 11a uniformly around the axis C. Moreover, the respective exposed portions of the plurality of lens surfaces 11a are equal to each other in diameter (i.e., the diameter D of the opening of the light-shielding layer 3). Therefore, it is possible to prevent the amount of incident light from varying between the lenses 11.

The light-shielding layer 3 provided in each recess 14 blocks and absorbs light traveling from one lens 11 to the adjacent lens 11. Therefore, the light-shielding layer 3 of each recess 14 prevents cross talk between the plurality of lenses 11. The light-shielding layer 3B of the lens array A2 functions similarly to the light-shielding layer 3 of the lens array A1. Therefore, with the lens array assembly X, it is possible to prevent unnecessary light from reaching the image forming point R in spite of the fact that both of the lens array bodies 1, 2 of the two lens array A1, A2 are formed of light-permeable synthetic resin. In addition to the lens surfaces 11a, the peripheral portions of the lens surfaces 11b, 21a, 21b are uniformly covered with the light-shielding layer 3 or 3B. Therefore, it is possible to avoid great variations between the lenses 11 and between the lenses 21 with respect to the manner of light propagation and the amount of light passage. Accordingly, it is possible to form a clear actual size erect image.

The lens array assembly X having the above-described optical characteristics may be preferably used in an image reading apparatus for reading a document image line by line to form an actual size erect image of the document image at a predetermined position. As described, the lens array A1 can be produced efficiently at a relatively low cost, and this holds true for the lens array A2. Therefore, the use of the lens array assembly X reduces the cost for manufacturing the entire image reading apparatus.

Figure 17:
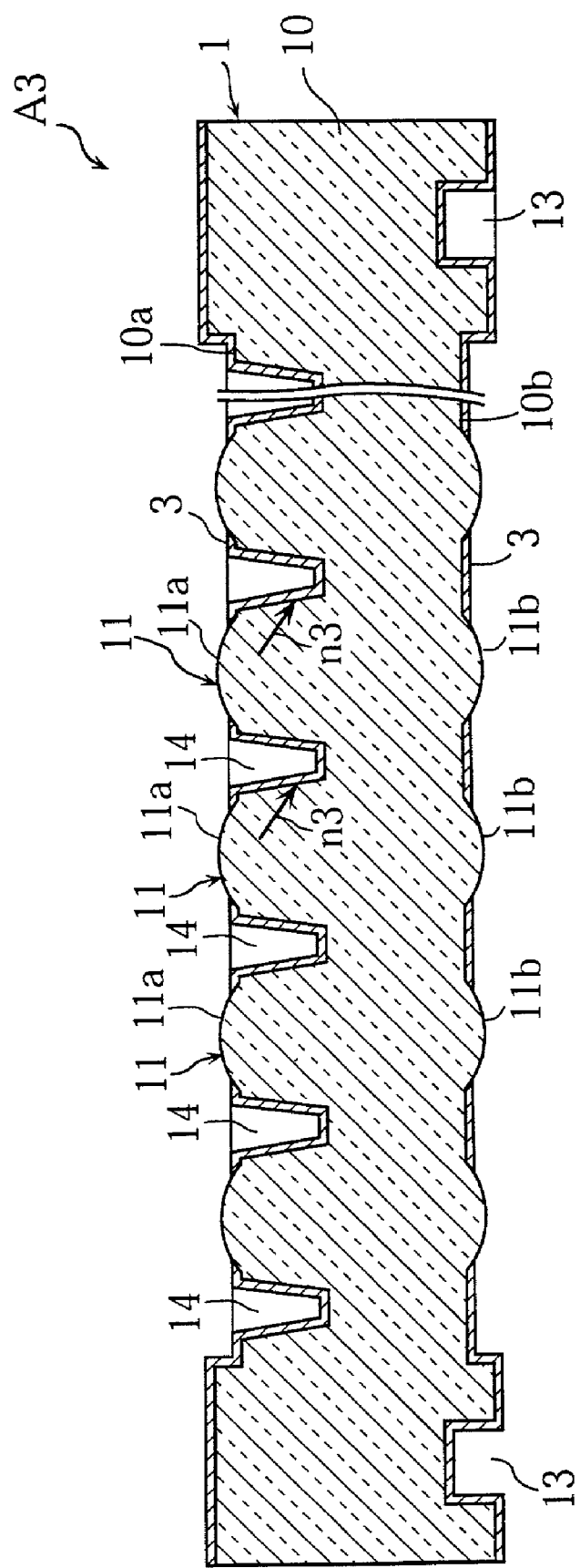
FIG. 17 is a sectional view showing an example of lens array in accordance with the present invention.
Figure 18:
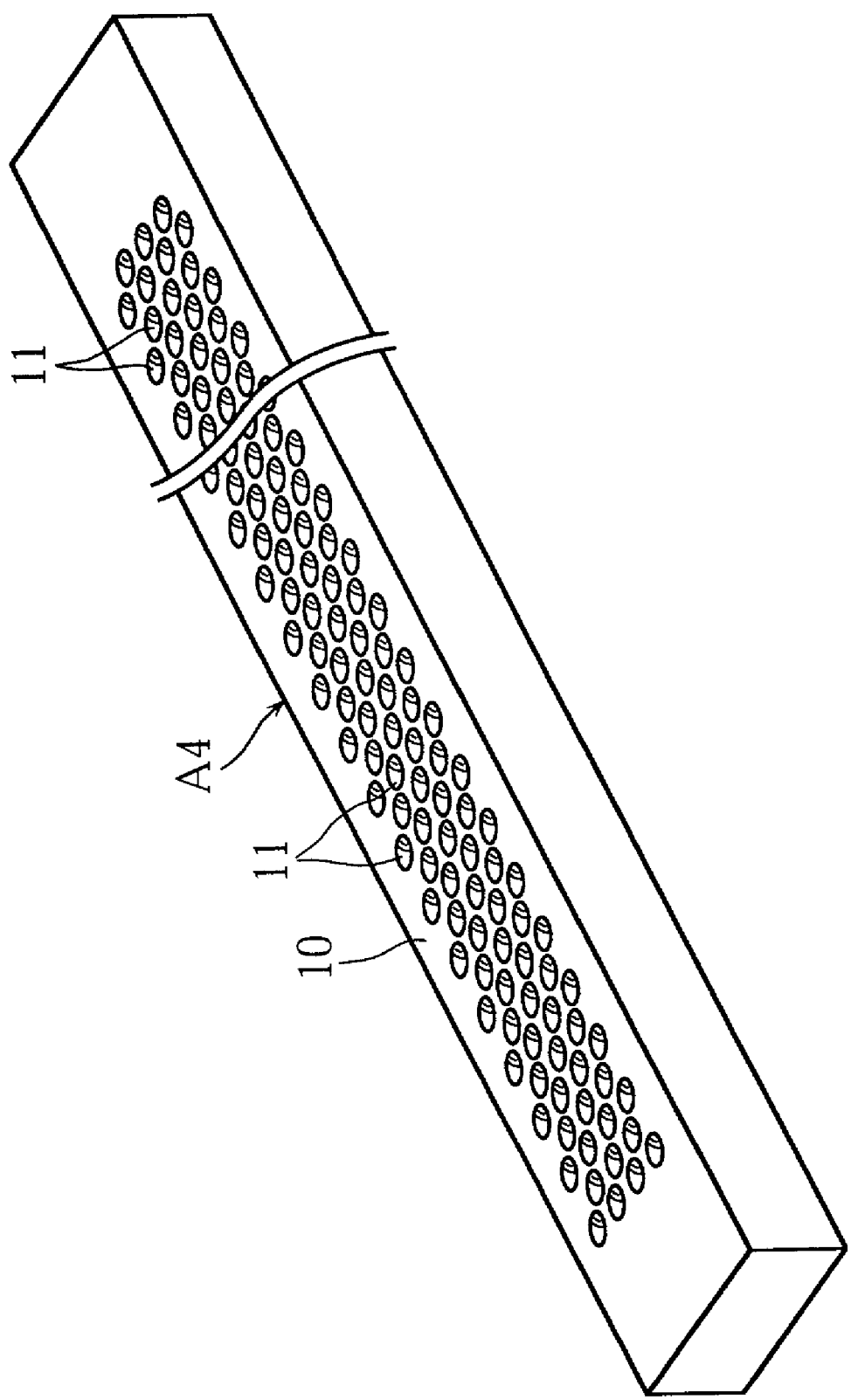
FIG. 18 is a perspective view showing another example of lens array in accordance with the present invention.
Figure 19:
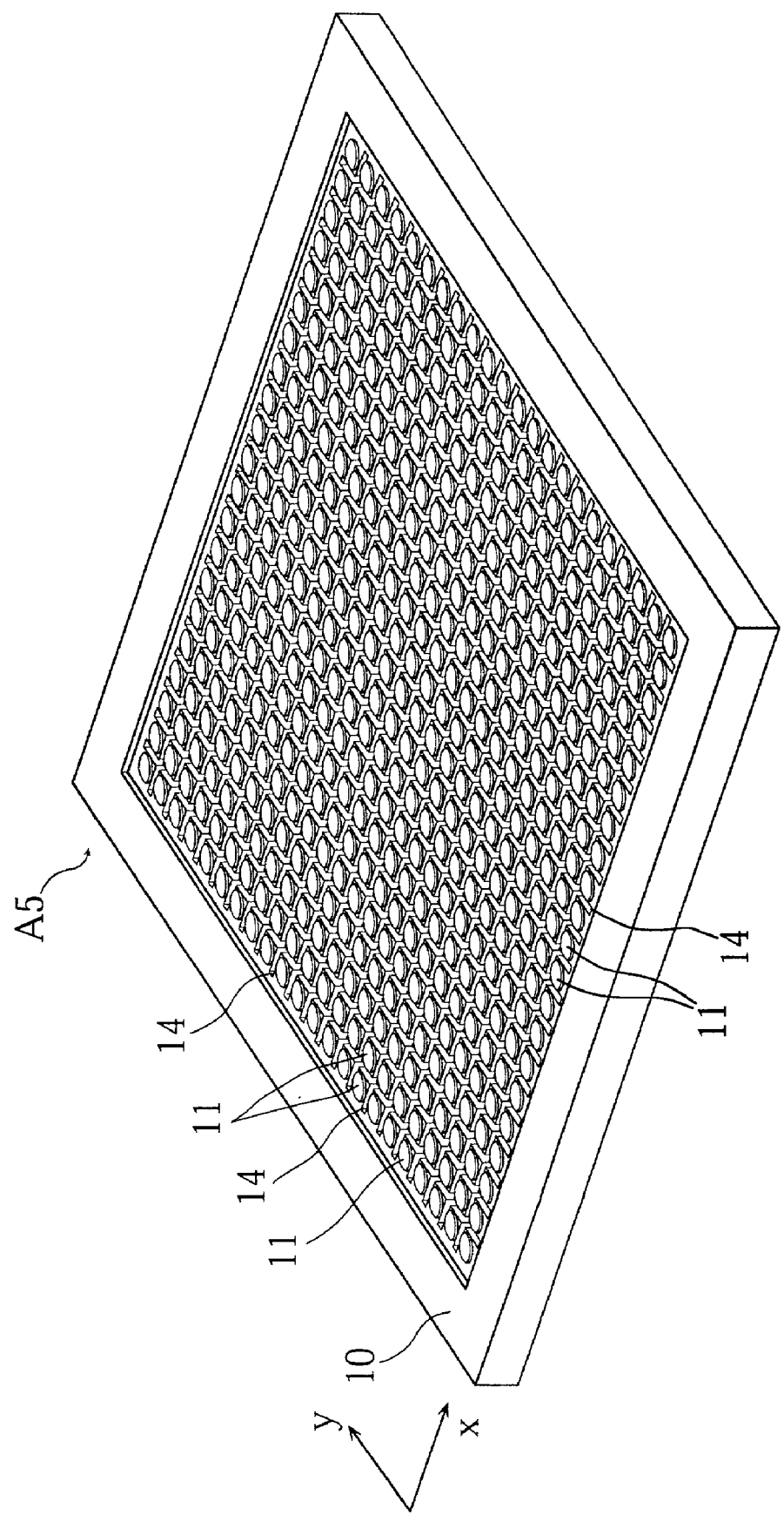
FIG. 19 is a perspective view showing still another example of lens array in accordance with the present invention.

FIGS. 17~19 illustrate another example of lens array in accordance with the present invention. In these figures, the elements which are identical or similar to those of the above-described lens array are designated by the same reference signs.

The lens array A3 shown in FIG. 17 includes a holder 10 which is formed with a plurality of recesses 14 only at the upper surface 10a. Even with this structure, as indicated by arrows n3, the light-shielding layer 3 provided in each recess 14 blocks light, so that it is possible to prevent cross talk of light between the lenses 11. Instead of this structure, a plurality of recesses 14 may be formed only at the lower surface 10b of the holder 10.

FIG. 18 illustrates a lens array A4 which includes plural rows of lenses, each row extending longitudinally of the holder 10. With this structure, it is possible to form a brighter image than with a lens array including only a single row of lenses.

FIG. 19 illustrates a lens array A5 which is a two-dimensional lens array comprising a matrix of lenses 11 extending in x and y directions intersecting with each other at right angles. A plurality of recesses 14 extending in each direction partition lenses 11. With this structure, it is possible to form an image having a certain area.

The present invention being thus described, it is apparent that the same may be varied in many ways. Such variations should not be regarded as a departure from the spirit and scope of the present invention, and all such modifications as would be obvious to those skilled in the art are intended to be included within the scope of the following claims.

The invention claimed is:

1. A lens array comprising:
a plurality of lenses each of which has a convex lens surface;
a holder portion for holding the lenses; and
a light-shielding member provided at the holder portion;
wherein the light-shielding member overlaps a circumferentially peripheral portion of each lens surface;
wherein the light-shielding member includes a first light-shielding layer and a second light-shielding layer which are made of different materials, the first light-shielding layer overlapping the circumferentially peripheral portion of each lens surface, the second light-shielding layer being formed at the holder portion so as to surround the first light-shielding layer.

* * * * *